J. C. FLEMING.
METHOD FOR COOKING, DIGESTING, AND DRYING MATERIALS.
APPLICATION FILED MAY 24, 1915. RENEWED AUG. 21, 1916.
1,200,419.
Patented Oct. 3, 1916.
3 SHEETS—SHEET 1.
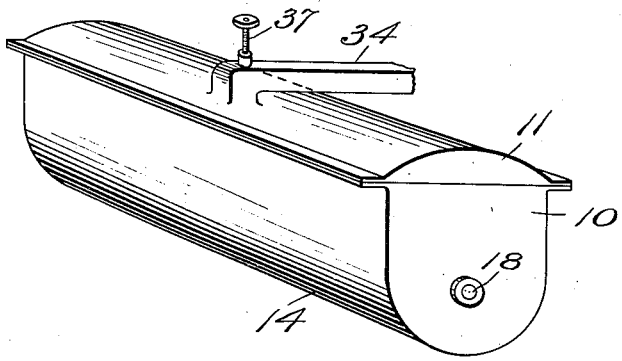
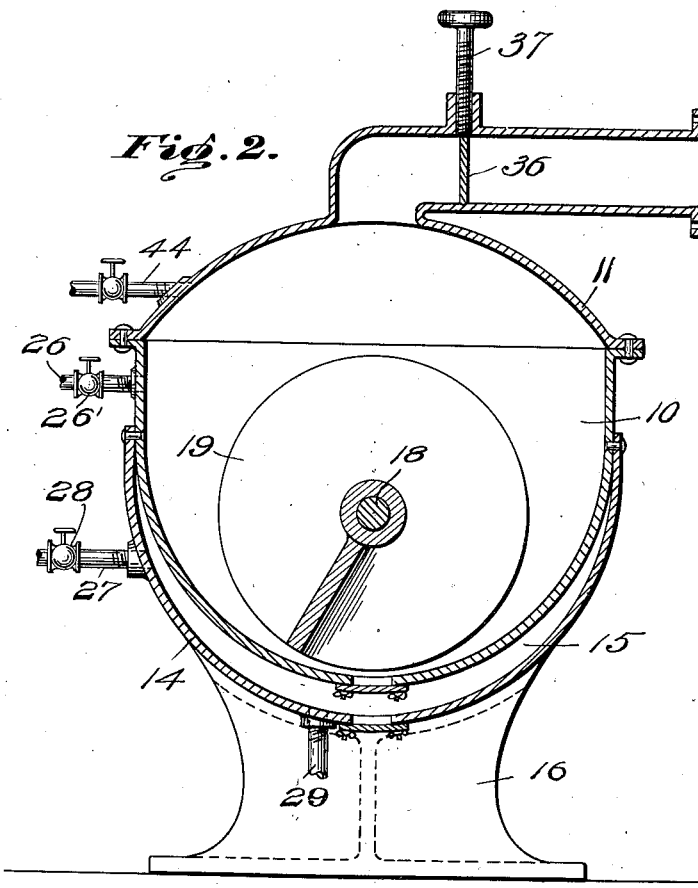

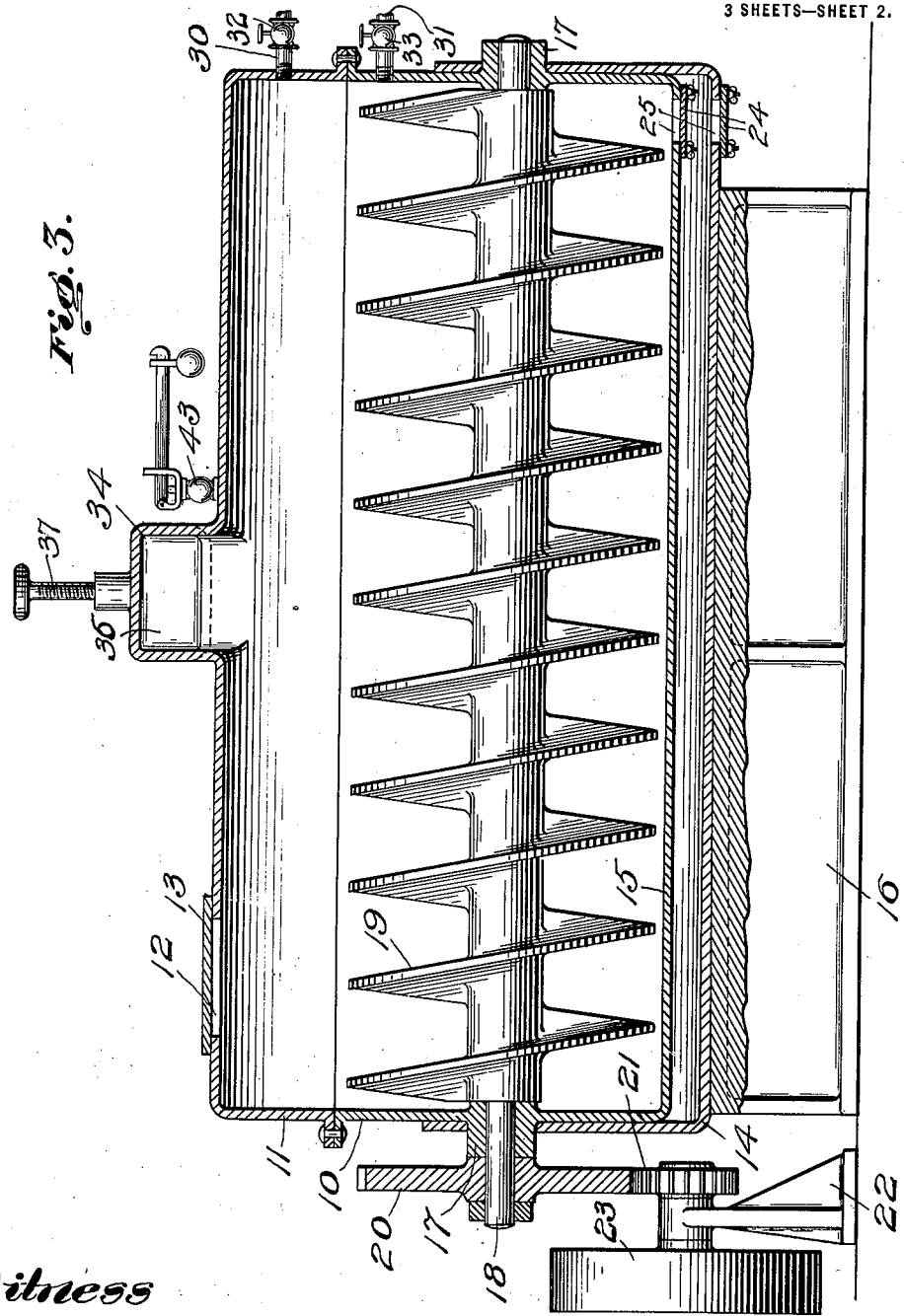

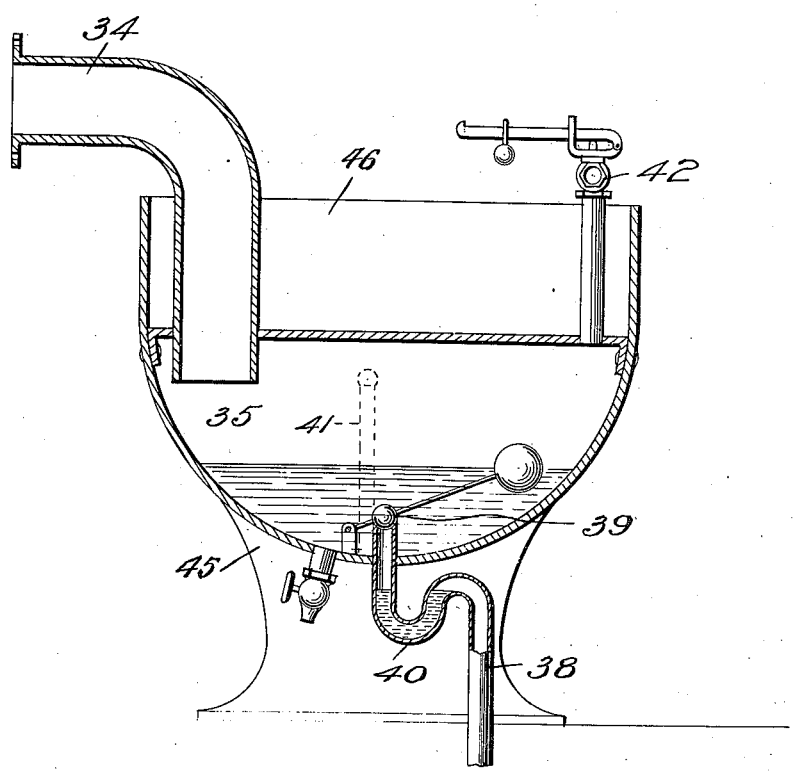

UNITED STATES PATENT OFFICE.

JOHN C. FLEMING, OF BOSTON, MASSACHUSETTS.

METHOD FOR COOKING, DIGESTING, AND DRYING MATERIALS.

1,200,419. Specification of Letters Patent. Patented Oct. 3, 1916.

Application filed May 24, 1915, Serial No. 30,245. Renewed August 21, 1916. Serial No. 116,191.

*To all whom it may concern:*

Be it known that I, JOHN C. FLEMING, of Boston, in the county of Sussex and State of Massachusetts, have invented certain new and useful Improvements in Methods of Cooking, Digesting, and Drying Materials, of which the following is a specification.

This invention is a method of cooking and digesting materials, preferably food products, and also for drying the same after the cooking and digesting process is carried out.

One of the objects of the invention is to so treat the material, that it will be thoroughly cooked and digested, and delivered in a dry and merchantable condition.

A further object is to conduct the moisture away to a point where it may be condensed in suitable manner.

A further object is to so control the conducting away of the moisture that particles of the material being treated are prevented from passing out with the moisture, because of the pressure within the digester, and the suction in the conduit by which the moisture is carried off.

A further object is to provide for thorough but quiet agitation of the material while being dried, and for maintaining the heat at the desired temperature.

A further object is to provide a method by which food products, or other materials are successively cooked, digested and dried within the same vessel or apparatus, whereby the material so treated may be converted from a raw state into a merchantable condition before being removed from the said vessel or apparatus.

The invention will be hereinafter fully set forth and particularly pointed out in the claims.

In the accompanying drawings: Figure 1 is a perspective view of an apparatus constructed to carry out the method, although the invention is not limited thereto. Fig. 2 is an enlarged transverse sectional view thereof. Fig. 3 is an enlarged longitudinal sectional view thereof. Fig. 4 is a transverse sectional view of an apparatus for condensing moisture.

Referring to the drawing, 10 designates a kettle or receptacle to contain the materials to be treated, the same being provided with a cover section 11 secured thereto and having an opening 12 closed by a suitable cover 13. Attached to and inclosing the lower portion of the receptacle 10 is a casing 14, so spaced from the bottom of the receptacle 10 as to form a steam space or jacket 15. The casing 14 rests upon a suitable base or support 16. Rotatably mounted in suitable bearings 17 attached to the receptacle 10, is a shaft 18, provided with a helical agitator 19. Attached to the shaft 18 is a pinion 20 meshing with a gear 21 attached to a suitable drive shaft supported by the base 22, and driven by a pulley 23, receiving its power from any suitable source. The driving mechanism which actuates the pulley 23 may be provided with any well known form of automatic reversing mechanism to effect periodical automatic reversals in the rotation of the agitator 19. The material to be treated is discharged from the receptacle 10 through a delivery opening 25 controlled by a gate valve 24, of any suitable or preferred construction.

Steam is delivered to the interior of the receptacle 10 by means of a pipe 26 controlled by a valve 26'. Steam likewise is introduced into the space or jacket 15 through a pipe 27 controlled by a valve 28, and is discharged through pipe 29. The receptacle 10 is also provided with pipes 30 and 31 at different levels, controlled respectively by valves 32 and 33, for drawing off any surplus liquids that may rise to the top of the material during the treatment.

All vapors or moisture developed during the cooking and digesting of the material within the receptacle 10, whether arising from the material itself, or resulting from the introduction of steam, are conducted off through a conduit 34 leading from the top of the receptacle and controlled by a valve 36 attached to an operating device 37. The moisture is conducted through conduit 34 into a condensing chamber 35 mounted upon a suitable base or support 45, the conduit being passed through a space 46 in which ice, or other suitable cooling medium is packed. The moisture, as it is condensed, accumulates in chamber 35, and when the fluid thus obtained accumulates to a predetermined amount, the same is automatically discharged through a pipe 38 controlled by a float valve 39. Said pipe 38 is provided with a trap 40 to prevent air from entering the chamber 35 by way of pipe 38. The chamber 35 is also provided with a suitable gage glass 41, and a safety valve 42 is provided, to relieve the pressure in chamber 35 should the same become too great. A safety valve 43 is also provided for the receptacle 10 to relieve excess pressure in said receptacle.

In practice the receptacle 10 is filled to the desired level through the opening 12, after which said opening is closed by the cover 13. Open steam is then introduced into the receptacle through pipe 26, until the pressure reaches the desired degree, preferably thirty to forty pounds to the square inch, varying according to the nature of the material being treated. During this step of the process the agitator 19 is at rest. After the material has been subjected to the desired extent, to the action of the open steam introduced into the closed chamber, the supply of steam entering pipe 26 is shut off, and steam is introduced into the jacket 15, and the rotation of the agitator 19 is effected through the driving mechanism as illustrated. In order to prevent the material being crowded into one end of the receptacle by the action of the agitator, rotation of the latter is periodically reversed by any of the well known mechanisms particularly designed for said purpose. When the heating medium is turned into the space 15, the valve 36 is opened to allow the escape of steam and vapors from the receptacle, the vapors thus escaping being directed to the chamber 35, being condensed into liquid as it passes into said chamber, the condensation taking place under the vacuum system. During this operation, air is permitted to enter the receptacle through a pipe 44, preferably in small volume, for the purpose of preventing any particles of the solid matter passing out through the conduit 34, the introduction of air in this manner serving to break the suction generated in the chamber 35, to such extent as to prevent the passage of anything but the vapors. If desired, the air entering pipe 44 may be purified in any suitable manner. After the material has been thoroughly dried, and the moisture substantially extracted therefrom, the valve 24 is opened, and the material is discharged through the opening 25, by the action of the agitator.

Having thus explained the nature of my invention, and described an operative manner of constructing and using the same, although without attempting to set forth all of the forms in which it may be made, or all of the forms of its use, what I claim is:—

1. The method of cooking, digesting and drying materials, comprising subjecting the material to be treated to direct contact with open steam while contained in a closed chamber until the material is cooked and digested, then shutting off the steam and applying external heat to said vessel to dry the cooked and digested material, and conducting moisture from the interior of said vessel during the drying process.

2. The method of cooking, digesting and drying materials consisting in subjecting the material to direct contact with open steam while contained in a closed chamber until the material is cooked and digested, then shutting off the steam and applying external heat to said vessel to dry the cooked and digested material, agitating the material during the drying step, and conducting moisture from the interior of said vessel.

3. The method of cooking, digesting and drying materials comprising subjecting the material to direct contact with open steam while contained in a closed chamber until the material is cooked and digested, shutting off the steam and applying external heat to the vessel to dry the cooked and digested material, conducting moisture from the interior of said vessel, and introducing a current of air into said vessel to prevent particles of the material from passing out with the moisture.

4. The method of digesting and drying materials comprising subjecting the material to direct contact with open steam while contained in a closed chamber until the material is cooked and digested, shutting off the steam and applying external heat to said vessel to dry the cooked and digested material, agitating the material during the application of external heat, conducting moisture from the interior of said vessel, and introducing a current of air into said vessel to prevent particles of the material from passing out with the moisture.

In testimony whereof I have affixed my signature.

JOHN C. FLEMING.